United States Patent Office 2,976,851
Patented Mar. 28, 1961

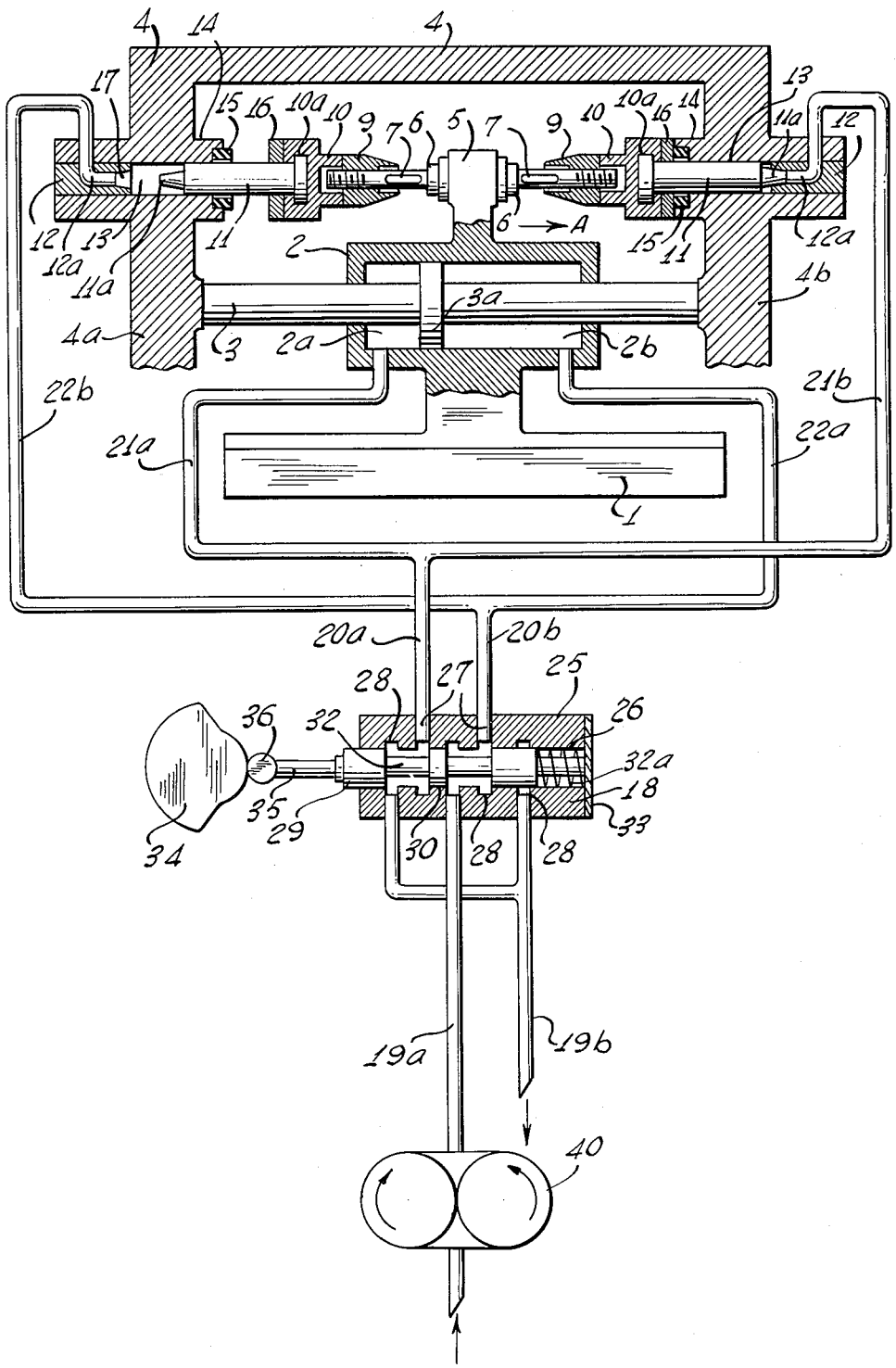

2,976,851

AUTOMATIC HYDRAULIC POSITIONING DEVICE FOR MACHINE PARTS

Helmut Keil, Zeulenroda, Karl Wagner, Dortendorf, Günter Feige and Kurt Söllner, Langenwolchendorf, and Eberhard Rüdiger, Weckersdorf, Germany, assignors to VEB Werkzeugmaschinenfabrik, Zeulenroda, Thuringia, Germany Filed Feb. 12, 1958, Ser. No. 714,902

Claims priority, application Germany Feb. 28, 1957

13 Claims. (Cl. 121—45)

This invention relates to tool controls and more particularly to devices for reciprocating tool carriers between spaced positions for the controlled processing of materials such as metals and the like.

In automatic equipment for the processing of materials, generally referred to as machine tools, there is a need for reciprocating tools between spaced positions for various types of operations. Examples of machines utilizing such operations include lathes, milling machines, rolling mills and so forth.

Heretofore, use has been made of controls which employ lever systems or series of links to effect movements of associated tool carriers. These means are subject to the objection that they include numerous bearings and connections which require undesirable tolerances resulting in inaccurate displacements of the associated tools. The play between the various parts of such systems is also a deleterious factor.

Accordingly, an object of the invention is to provide an improved tool displacement means or control which avoids the deficiencies inherent in heretofore known devices. More particularly, this object consists of providing a simple, easily operated device which possesses all of the important characteristics necessary for accurately reciprocating a tool between spaced positions. Advantageously, the invention contemplates the utilization of a pressure actuated piston-and-cylinder mechanism in which the cylinder is movable on the piston and supports the tool carrier. The pressure is preferably effected by a hydraulic medium.

A feature of the invention is the provision of a braking system whch is operative in response to the movement of the aforesaid cylinder on the piston and which enables the movement of the cylinder to be controlled in a smooth manner free from rapid changes in direction of forces if such is desired.

Other features of the invention include the provision of adjustable stops for limiting the movement of the cylinder on the piston and of scale means to permit a ready adjustment of the positions of the stops.

Further objects and features of the invention will be found in the following detailed description of a preferred embodiment as illustrated in the accompanying sole figure diagrammatically disclosing the apparatus.

The drawing is a sectional schematic representation of a tool displacement device constructed in accordance with this invention.

In the drawing, a tool carrier or holder 1 of a lathe, press, rolling mill or like device is connected to or integral with a master cylinder 2 in which two chambers 2a 2b are defined by the provision, on a piston rod 3, of a piston head 3a.

The cylinder 2 is slidable on the rod 3 which is fixed on the housing or casing 4 of the apparatus, the rod 3 being more particularly fixed between the spaced supports 4a and 4b.

On the cylinder 2 is rigidly fixed or connected a hub 5 from which extend, in opposite directions, two units which are in parallel relationship to the rod 3. These units each include a bolt 6 threaded at least in part and provided with a scale indicator means 7. The bolts 6 are parts of adjusting means further including the adjustment nuts 9 threadably engaged with the bolts 6 and lock nuts 10 for fixing the engagement between the bolts 6 and adjustment nuts 9.

The units also include bayonette catches 10a connected with lock nuts 10 and in turn supporting supplementary pistons or plungers 11.

Inserts 12 provided with passages 12a are accommodated in bores 13a and 13b in the supports 4a and 4b. The bores 13a and 13b and the material definitive thereof actually constitute supplementary cylinders for receiving the supplementary pistons or plungers 11. The bores 13a and 13b extend through shoulders 14 in which are mounted resilient pads 15 which can be rubber washers.

The pads 15 are intended to engage discs 16 which are mounted on the catches 10a and these members together form stop means for limiting the travel of the cylinder 2 in either direction on the rod 3. These stop means are adjustable by virtue of the provision of threadably engaged members 6 and 9.

Also involved in stopping the movement of the cylinder 2 are the inserts 12 whose passages 12a extend into openings or ports 17 which are frusto-conically shaped for receiving the correspondingly shaped portions 17a at the ends of plungers 11.

The source of pressure medium for operating the system is a distributing slide valve 18 which is connected to a hydraulic pump or like device. The valve 18 is connected to the feed and return conduits 19a and 19b respectively and the pressure medium is urged selectively into one of the conduits 20a and 20b.

The slide valve 18 includes a cylinder block 25. An internal bore of uniform diameter 26 passes longitudinally through one end of the block and communicates with conduits 19a, 19b, 20a and 20b by means of radially directed outlet ports 27 which intersect the internal bore and by spaced annular grooves 28 along the bore 26.

Three coaxial pistons 29, 30 and 31 are mounted upon a piston rod 32 at spaced positions and are slidably mounted within the bore 26 to selectively block communication between the bore 26 and selected outlet ports. A spring 32a between the end wall 33 of the cylinder block 25 and piston 31 biases the piston rod 32 against a rotatably mounted cam 34 by means of a connector rod 35 and cam follower 36.

The position of cam 34 will locate the sliding pistons so as to selectively open the ducts 19a and 19b.

The conduit 20a is coupled respectively via its extension 21a to the chamber 2a and via the extension 21b to the bore 13b which is on the opposite side of the piston head 3a relative to the chamber 2a. The conduit 20b is coupled respectively via its extension 22a to the chamber 2b and via the extension 22b to the bore 13a which is on the opposite side of the head 3a relative to the chamber 2b.

For purposes of illustrating the operation of the device, let it be assumed that the valve 18 is selectively directing the pressure medium (for example, oil or water) through the conduit 20b. Part of the medium flows through the extension 22b into the associated bore 13a and part through the extension 22a to the chamber 2b. The chamber 2a and associated bore 13b are connected to return line 19a by means of line 20a and valve 18.

Entry of the pressure medium into chamber 2b will cause a displacement of the cylinder 2 toward the right as shown by the arrow A. The movement of the cylinder 2 is limited, however, by the engagement of the members 15 and 16 which are included in the stop means. Moreover, the plungers 11 whose positions have previously been fixed by adjustment of the members 6 and 9 move with the cylinder 2 so that the medium is forced out of the bore 13b. Since bore 13b is connected to return line 19a, fluid will be discharged until the conically shaped end 17a of plunger 11 begins to enter opening 17 in the insert 12. The fluid port between conical end 17a and the walls of opening 17 gradually becomes narrower and the resulting friction forces increasingly counteract the force exerted by the fluid in chamber 2b upon cylinder 2 and plunger 11 thereby gradually slowing down the movement of cylinder 2 until it finally comes to a halt by abutting engagement of pads 15 and discs 16.

Reversal of the direction of travel of the cylinder 2 is controlled through the valve 18 in any known manner, but, by way of example, a cam-actuated switch and solenoid arrangement (not shown) can be employed to provide any pattern of operation desired.

The device which has been described possesses none of the deficiencies inherent in systems employing series of levers, the movement of the cylinder 2 being affected only by the fit thereof on the rod 3 and head 3a. If oil is employed as the pressure medium, these parts are lubricated automatically and their wear is minimized.

The transition of movement of the tool from one direction to the opposite is smoothly effected and consequently assures a controlled operation. The system is easily operated as evidenced by the simple adjustment means for controlling the positions of the stops.

There will now be obvious to those skilled in the art many modifications and variations of the apparatus set forth, these merely being equivalents of the structure described and not being distinguishable from the invention as defined in the following claims.

What is claimed is:

1. A hydraulic positioning device for displacing the tool carrier of an automatic machine tool, comprising a source of pressure medium provided with a feed conduit and a return conduit, master piston-and-cylinder means coupled to said source of pressure medium, the master piston of said master means being mounted in the master cylinder of said master means for relative reciprocating movement of said cylinder and said piston between a first and a second terminal position in response to the pressure of said medium; and supplementary piston-and-cylinder means coupled to said source of pressure medium, the supplementary cylinder of said supplementary means being formed with a port near one end thereof for passage of said medium, and the supplementary piston of said supplementary means being reciprocable in said supplementary cylinder between a position obstructing said port and a position remote from said port, said supplementary means being connected to said master means for coordinate movement therewith; said supplementary piston being positioned to gradually obstruct said port as said master piston approaches said first terminal position within said master cylinder, movement of said supplementary piston being impeded by the restriction of the flow of medium through said port, and a braking action being exerted by said supplementary piston on said master means.

2. A device as set forth in claim 1, including an adjustably fixed stop positioned to block the relative movement of said master cylinder and said master piston.

3. A device as set forth in claim 1, wherein said master piston-and-cylinder means is double-acting, said master piston dividing said master cylinder into a first and a second chamber; wherein said supplementary piston-and-cylinder means comprises first and second supplementary piston-and-cylinder mechanisms; said device further comprising conduit means selectively connecting said first chamber and first supplementary mechanism, and said second chamber and second supplementary mechanism to said feed conduit and to said return conduit respectively of said source of pressure medium, whereby a braking action is exerted by said first and by said second supplementary piston respectively on said master piston-and-cylinder means when said master piston approaches said first and said second terminal position respectively.

4. A device as set forth in claim 3, wherein said master cylinder is movable on said master piston.

5. A device as set forth in claim 3, wherein said supplementary pistons are connected to said master cylinder and said supplementary cylinders are rigidly supported on said master piston.

6. A device as set forth in claim 3, comprising fixable stops for limiting the movement of said master cylinder.

7. A device as set forth in claim 6, comprising adjustment means for adjusting the positions of said stops, and scale means on said adjustment means giving a visual indication of the adjustment.

8. A device as set forth in claim 1, the supplementary cylinder of said supplementary piston-and-cylinder means being formed with a conical port in one end thereof, and the piston of said supplementary piston-and-cylinder means being formed with a conical front surface for mating engagement with said port and for gradual obstruction thereof.

9. A device as set forth in claim 1, wherein said source is a source of hydraulic pressure medium.

10. A hydraulic positioning device comprising: first cylinder means including a chamber having a stationary portion, a moving portion engaged with said stationary portion to form said chamber and a fluid port in one of said portions; second cylinder means including a chamber having a stationary portion, a moving portion engaged with said stationary portion to form said chamber, and a fluid port in one of said portions; means connecting said moving portions of said cylinder means to each other for coaction in opposing relation with respect to the volume of said chambers, whereby the volumes of said chambers vary inversely during coaction; duct means hydraulically connected to said ports to selectively supply fluid under pressure to said cylinders, means connecting said ducts to provide discharge of fluid from one of said cylinders during influx to the other of said cylinders, a tapered plunger mounted on one of said portions of said first cylinder in position to mate with said port of said cylinder as the volume of said cylinder reaches its minimum whereby said plunger progressively obstructs the orifice of said port and restricts discharge from said first cylinder.

11. A hydraulic positioning device comprising master cylinder means including a cylinder, a piston and a fluid port in said cylinder; supplementary cylinder means including a cylinder, a piston and a fluid port in said cylinder; means connecting said piston in one of said cylinder means to the other of said cylinder means for coaction in opposing relation whereby the volumes of said cylinder means vary inversely during coaction; duct means hydraulically connected to said ports to selectively supply fluid under pressure to said cylinders; means connecting said ducts to provide discharge of fluid from one of said cylinders during influx to the other of said cylinders; a tapered plunger mounted on said piston of said supplementary cylinder means in position to mate with the port of said cylinder of supplementary cylinder means, as the volume of said cylinder reaches its minimum, whereby said plunger progressively obstructs the orifice of said port and restricts discharge from said first cylinder.

12. A hydraulic device comprising master cylinder means including a stationary piston and a movable cylinder; supplementary cylinder means including a stationary cylinder and a movable piston; a mechanical connector connecting said movable master cylinder and said movable supplementary piston for coaction whereby the volumes of said cylinder means vary inversely; and duct means connected to said cylinder means adapted to alternately and selectively supply fluid to each of said cylinder means.

13. A hydraulic device comprising a master cylinder means including a movable cylinder and a fixed piston dividing said movable cylinder, supplementary cylinder means including a pair of cylinders and a pair of opposed movable pistons; a mechanical connector connecting said opposed movable pistons to said movable cylinder; and duct means connected to said cylinder means for alternately and selectively supplying fluid to one of the combination of one side of said master piston and one of said fixed cylinders.

References Cited in the file of this patent

UNITED STATES PATENTS

| | | |
|---|---|---|
| 877,635 | Dietz | Jan. 28, 1908 |
| 2,222,819 | Light | Nov. 26, 1940 |
| 2,223,792 | Muir | Dec. 3, 1940 |
| 2,503,985 | Adams et al. | Apr. 11, 1950 |
| 2,605,751 | Perry et al. | Aug. 5, 1952 |
| 2,710,595 | Peterson et al. | June 14, 1955 |
| 2,783,743 | Pappas | Mar. 5, 1957 |
| 2,853,974 | Hewitt | Sept. 30, 1958 |

FOREIGN PATENTS

| | | |
|---|---|---|
| 2,877 | Great Britain | Feb. 8, 1908 |